United States Patent
Bishop

[11] 3,994,031
[45] Nov. 30, 1976

[54] FLANGED TRAP INCORPORATING ACCESS FITTING

[76] Inventor: Robert L. Bishop, R.R. No. 2 Box 130, Ballwin, Mo. 63011

[22] Filed: Dec. 18, 1974

[21] Appl. No.: 533,856

Related U.S. Application Data

[63] Continuation-in-part of Ser. No. 394,047, Sept. 4, 1973, abandoned.

[52] U.S. Cl. .............................. 4/207; 137/247.49
[51] Int. Cl.$^2$ ......................................... F16L 43/00
[58] Field of Search ............... 4/1, 14, 15, 69, 71, 4/197, 207, 255, 257, DIG. 7, DIG. 14, DIG. 16; 137/247.11, 247.41, 247.49, 247.51; 138/92; 285/18, 121, 124, 127, 157; D23/46

[56] References Cited
UNITED STATES PATENTS

| | | | |
|---|---|---|---|
| 934,035 | 9/1909 | Brady | 137/247.41 |
| 991,123 | 5/1911 | Willetts | 137/247.41 |
| 1,198,759 | 9/1916 | Pinder et al. | 137/247.51 |
| 1,210,201 | 12/1916 | Perkins | 137/247.41 X |
| 1,308,582 | 7/1919 | Cronk | 137/247.41 |
| 2,593,734 | 4/1952 | Davis | 137/247.51 |
| 2,742,101 | 4/1956 | Stambaugh | 137/247.41 |
| 2,749,148 | 6/1956 | Schneiderman | 285/121 |
| 3,620,554 | 11/1971 | Ward et al. | 285/18 |

FOREIGN PATENTS OR APPLICATIONS

| | | | |
|---|---|---|---|
| 20,746 | 1901 | United Kingdom | 137/247.49 |

Primary Examiner—Richard E. Aegerter
Assistant Examiner—Stuart S. Levy
Attorney, Agent, or Firm—Paul M. Denk

[57] ABSTRACT

A trap incorporating an access fitting and of the type that may be designed into a P-trap, or S-trap configuration, the trap including an inlet segment and an outlet segment, both being integrally joined together, and a lower arcuate portion forming the access fitting that intervenes and joins together for communication the interior channel through the trap, the interior channel being of a fixed diameter throughout its extent, and forming a continuous smooth wall interior surface along the entire length of the trap. A flange projects integrally from both the combined upper inlet and outlet integral sections, while a corresponding and registering flange extends from the arcuate portion for arrangement in alignment with the upper segment flange to facilitate assembly of the trap. The plane of separation between the upper segments and the lower arcuate portion or fitting is provided between the weir formed by the interior surface of the channel formed between the upper inlet and outlet segments, and that location downwardly therefrom where the fixed diameter of the channel commences to reduce in dimension below its full diameter due to its lower disposition within the arcuating portion of the access fitting of the trap.

9 Claims, 15 Drawing Figures

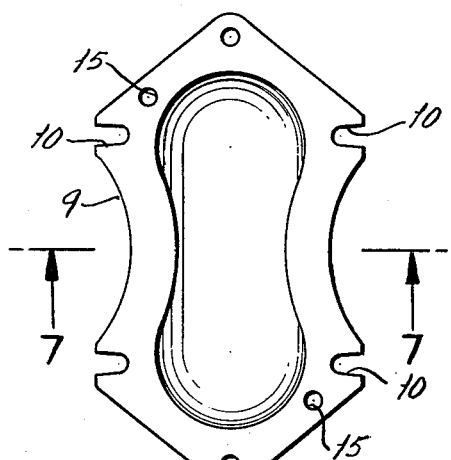
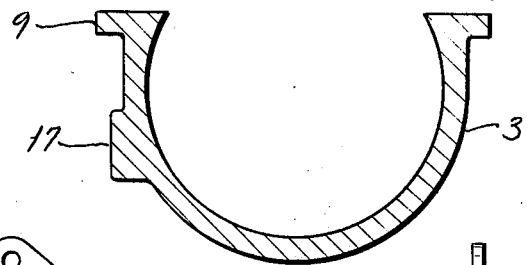
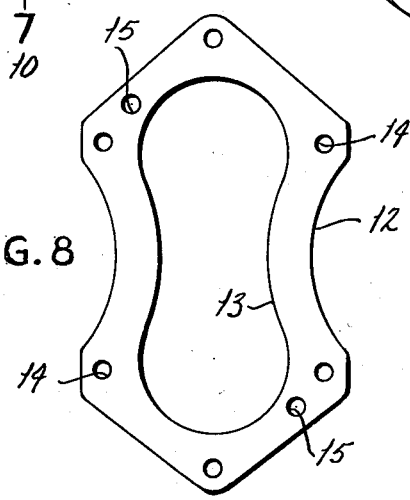
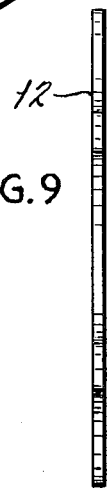
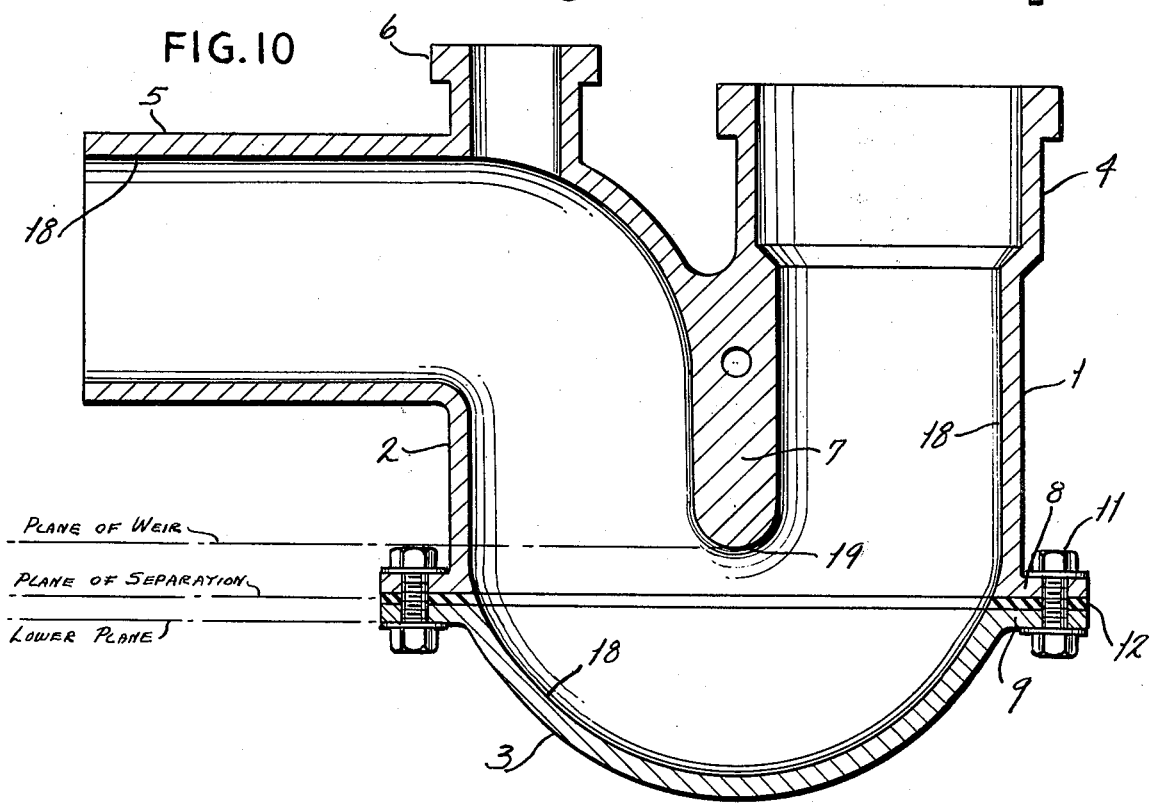

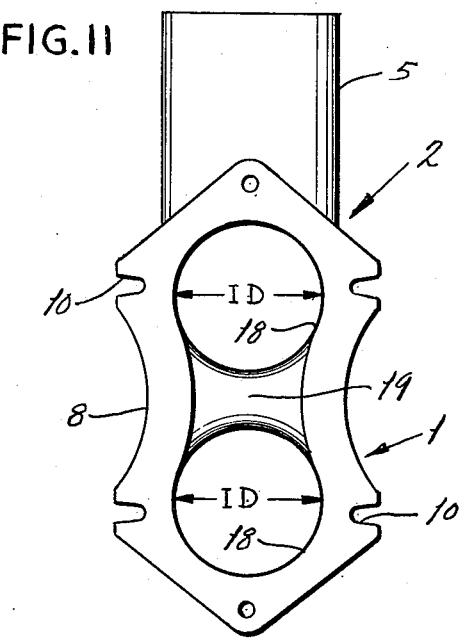
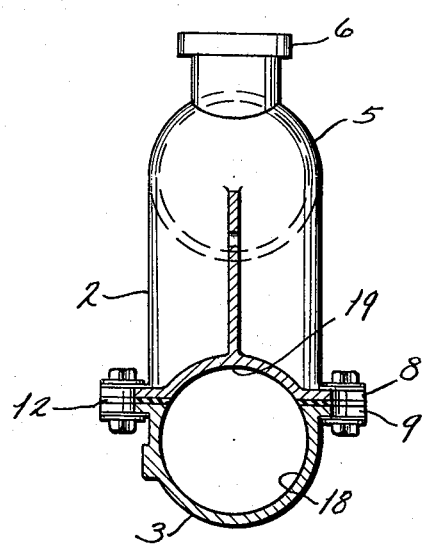
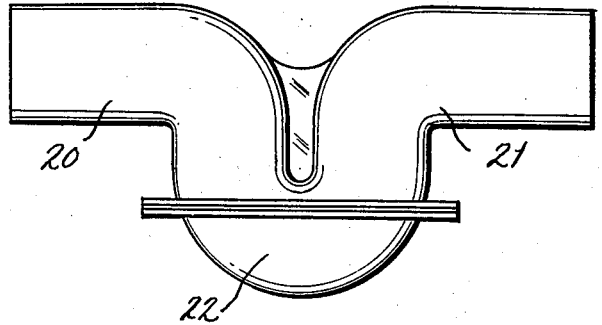
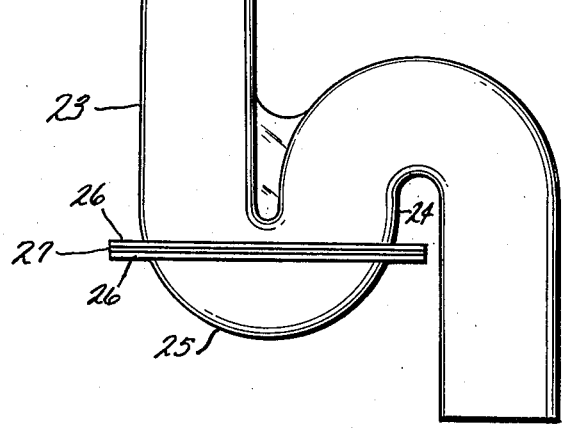

FLANGED TRAP INCORPORATING ACCESS FITTING

CROSS REFERENCE TO RELATED APPLICATION

The subject matter of this application is related to and comprises a continuation-in-part of my application having Ser. No. 394,047, filed on Sept. 4, 1973, now abandoned.

BACKGROUND OF THE INVENTION

This invention relates generally to plumbing conduits, but more specifically pertains to a trap of various designs, and which maintains a uniform dimension for its interior flow channel while allowing direct lineal access into the same during cleanout.

Various style of plumbing traps and the like have been available in the prior art, but most of these traps are designed particularly in the configuration of a P-trap, that is principally designed for furnishing a debris obstructing compartment with little or no concern for continuing flow during its use.

For example, in the British Pat. No. 20,746, issued to Platt, there is disclosed a form of trap wherein its individual upper tubes are connected together by means of syphon principally to act as a syphon-trap for drainage of other pipes. While such a trap might function reasonably well after installation, mainly in domestic installations, it contains its own inherent problems in that its upper pipes or tubes are generally structurally isolated from each other until the lower syphon provides for their interconnection. Furthermore, most of not all local standard plumbing codes would generally disallow authorization for use of such a trap due to the fact that it could not pass the variety of tests, such as the ball test, as frequently required in plumbing codes or regulations. Under such tests, a ball only slightly less than the interior diameter of the trap pipes must freely pass through both the inlet, its gooseneck, and the outlet pipe with no obstruction, and it can be seen due to the reduced diameter of the inserting ends of the pipe of the shown trap that obstruction to free passage of any such test ball would be encountered, either from gaining entrance into the trap or out of the same to the outlet tube.

Other forms of traps are also available in the prior art, such as the waste pipe trap to Pinder, et al, U.S. Pat. No. 1,198,759, wherein a removable lower trap portion is held by means of a bolt to the waste pipe of the sewer line.

Obviously the configuration of the trap as shown in its FIG. 2 is undesirable, due to the disposition of the fastening bolt directly in the flow path provided through the trap, but that in other configurations for this trap as shown in FIGS. 1 and 5, the wedging together of the trap portions creates an internal shoulder that reduces the continuous smooth interior surface formed in the flow path of said trap. Furthermore, in the event that an obstacle slightly less than the interior diameter of the flow path of the shown sewer pipe should become lodged in the same, and should this obstacle have any longitudinal length to it, it would be impossible to remove the same by means of opening the trap portion due to the inherent curvature of the upper pipe sections of the trap. Hence, to remove any larger debris from this particular trap, it would be necessary to open the couplings holding the entire U-shaped portion to the sewer pipes in order to remove any such obstruction, thereby making the benefits to be attained from the trap itself rather futile.

Various other styles of plumbing traps or drain traps are also available in the art, such as shown in the patents to Stambaugh, U.S. Pat. No. 2,742,101, and David, U.S. Pat. No. 2,593,734, wherein there are shown various styles of bowl shaped traps that may be mounted to the downward portions of the drain pipes for the purpose of collecting any debris entering into the sewer line. While the shown traps probably work well for their intended purposes, that is as debris traps, it is unlikely that they can function effectively as that form of a trap for allowing for continuous flow, and smooth passage, of the sewer contents directly through the trap, therein achieving the benefits of a gas trap, without causing the build up of any obstruction therein, such as is usually achieved in the semi-spherical bowl type of trap as shown in these prior art patents. For example, it would appear that the David trap is designed incorporating a semi-spherical body portion as its trap, as identified in the patent, which may have continuity of flow surfaces along the outer edge of the interior surface as shown in lengthwise cross section, in FIG. 3, but provides obstructing shoulders along its transverse dimensions due to the widening of the bowl along its width with respect to its incoming and outgoing sewer pipes. The same is true with respect to the drain trap shown in the Stambaugh patent. Hence, in either of these traps, it would appear that the standard ball test would meet failure due to the debris catching attributes of the semi-spherical body portions constructed into the traps, whereas the present invention is designed to obviate this particular feature in furnishing continuity of inner surface throughout the entire channel length of the trap and particularly where it joins with both the inlet and outlet segments of the associated sewer lines.

It is, therefore, the principal object of this invention to provide a pipe trap, whether it be of the P-trap type, or the various forms of S-trap types, wherein smooth flow features are provided within the interior channel of the trap for offering no obstruction to the continuous flow of any sewage or fluids therethrough, while yet presenting the attributes of a gas trap.

Another significant object of this invention is the provision of a separable pipe trap access fitting wherein the plane of separation between the fitting and its inlet and outlets is such that direct linear access may be made into the interior of these trap segments to provide for the removal of any large debris that may become lodged therein.

Another object of this invention is to provide a trap wherein the plane of separation between each inlet and outlet segments and the removable lower trap arcuate portion, or access fitting, is arranged between the inverted weir of the trap and that location therebelow where the fixed diameter of the trap commences to reduce in dimension such as normally prevents direct lineal access into its inlet and outlet segments for removal of any large obstructions.

Another object of this invention is to provide a trap wherein its inlet and outlet segments are integrally connected together by means of a reinforcing web to therein provide a very rigid and sturdy upper trap member that finds enhanced utility particularly in industrial applications.

An additional object of this invention is to provide a trap wherein its lower arcuate portion or fitting incorporates a boss to which any type of sampling instrumentality may be affixed to provide an instant tap of any of the enclosed fluids for testing.

Another object of this invention is to provide a trap wherein its separable components may be joined together by means of a pair of flanges, but which flanges may yet be separated, even after they may become corrosively united as through prolonged usage of the trap for many years, by means of a connecting jack screw.

Yet another unique feature of this invention is to provide a trap that has an interior channel of fixed diameter throughout its extent for forming a continuous, and nonobstructive, smooth wall interior surface along the flow length of the entire trap.

Still another object of this invention is to provide a trap which due to its integral construction may be easily installed with a minimum of labor.

These and other objects will become more apparent to those skilled in the art upon reviewing the summary of this invention, in addition to a study of the description of the preferred embodiment in view of its drawings.

SUMMARY OF THE INVENTION

The present invention is designed to incorporate into a trap, rather it be of the P-type or S-type, those features in combination which are not particularly shown in the prior art style of traps as hereafter enumerated.

1. A trap wherein its interior channel is of a fixed diameter throughout its extent and forms a continuous smooth wall interior surface offering no obstruction to the flow of any fluids, sewage, or even passable debris, therethrough;

2. A trap in which its integrally connected inlet and outlet segments are separable from a lower arcuately designed trap access portion by a plane of separation that is maintained between the inverted weir of the upper trap segment and that theoretical plane therebelow which the fixed diameter of the interior channel is distorted in shape to an extent that prevents direct lineal access into the legs of said inlet and outlet segments of the trap, or removal of any enlarged debris therefrom;

3. A trap that has integrally cast flanges joining with both its inlet and outlet segments and its lower arcuate trap access portion, which flanges are in registry so as to accommodate fastening means for securing these portions rigidly together, but also incorporates a jack screw for separation of the same even after many years of usage of the trap after initial installation; and 4. A trap which is constructed principally from rigid cast iron, or even a polymer, and which is of such a sturdy design so as to allow for its application in industrial plants for prolonged usage.

The principle of this invention is somewhat related to the design for pipelines as shown in my earlier U.S. Pat. No. 3,756,287, upon a pipe fitting access, wherein the significance of that invention was to provide a means for access into a pipe line to achieve mainly its cleaning, while at the same time utilizing a fitting that complements and maintains the smooth inner surface for the interior of the pipeline. The present invention is designed to expand upon the principle of that invention for use specifically in a trap, whether it be of the P-trap, or S-trap category, so that uninterrupted flow of sewage through the trap can be maintained with little or no obstruction, while yet incorporating a structural arrangement that provides for direct lineal access into the inlet and outlet of the trap for removal of any larger debris.

Perhaps the benefits of this particular feature of the present invention can best be analyzed by a discussion of the trap of this invention in actual usage, and principally, the trap is designed for industrial applications and has been particularly used as an installation in brewery operations.

The applicant has for many years services the plumbing structures for a rather large brewery, and frequently, the flow drains on the bottling and canning levels of the brewery are apparently looked upon by maintenance men as an outlet for any or all debris being swept up during janitorial servicing. On more than one occasion when the applicant has been called upon to service a clogged drain, he has been required to remove the entire trap from the associated pipe line, which, as can be understood, is rather a major task, since usually such traps are located proximate the ceiling of the floor below, and are generally constructed for heavy industrial usage of the standard cast iron. In unclogging such drains, the entire trap almost always has to be removed since the standard drain probes are usually of little beneficial use. When removing such traps, applicant frequently found a whole beer can lodged within the curved portion of the trap, having been either accidentally or even intentionally swept into the drain by one of the service men. Generally, drains of this nature are intended to receive some debris that is normally passed by the flood of water on the brewery floor, proximate the drain, but that the obstruction of a larger beer can within such a drain cannot be accommodated under any circumstances. Therefore, applicant conceived of the idea, and constructed, a form of trap that yet includes a smooth and continuous inner surface throughout a fixed diameter along the channel of the pipe line and trap, so that the normal flow of water and floor debris will flow interruptedly through the sewer line for disposal, but that the trap incorporates a lower arcuate segment, or access fitting, which upon removal provides for a direct lineal access into both the inlet and outlet segments of the trap flow channel, but preferably the inlet line of the trap so that any elongated larger debris, such as the beer can, can be easily removed and disposed of, without requiring a total removal of the entire trap. To achieve this arrangement in a trap, it was recognized that the plane of separation between the inlet and outlet segments of the trap and the lower arcuate access portion must be made, for strength purposes, below the inverted weir or sluice of the trap, but yet above that theoretical plane therebelow, below which the inlet and outlet interior channels commence to curve and become distorted in cross section presenting a reduced diameter less than the maintained fixed diameter of the channel provided entirely through the trap structure. Having a full diameter inlet and outlet channels exposed upon removal of the access portion of the trap is also beneficial since fixed diameter commercial sewer cable cutters can be inserted during cleanout, or even due to the smooth surface walls of this trap provided when it is assembled, such cutters can more easily be accommodated therein for in place rapid cleanout. Such cannot really be attained in the available prior art type of traps.

This plane of separation designed into the present trap is formed at a location within the paramaters previously defined, and at this location exposes a form of toroid like opening in both the arcuate access portion of the trap and its combined inlet and outlet channel segments. Hence, the flow channel provided interiorly through the trap, when opened, is separated at this location in the trap, exposing a conic like surface for the channel within the upper segment of the trap that forms the inverted weir of the trap, while the lower arcuate access portion of the trap exposes a corresponding conic surface throughout its extent which is complementary to the upper interior surface for forming a complete channel having the same fixed diameter throughout the extent of the trap when this portion and the inlet and outlet segments are joined together.

The lower plane, that is, that plane below the plane of separation of the trap at which substantially lineal access into the inlet and outlet segments of the same commences to become distorted thereby preventing the removal of any enlarged debris, such as a beer can, from the interior channels of these segments of the trap, can be located as follows: It has been empirically determined that the position of this lower plane within the style of the P-trap shown in the drawings preferably should be no lower than one fourth the diameter of the interior channel when arranged at a perpendicular with respect to a tangent drawn at the low point of the plane of weir, which in FIG. 10, such a tangent would fall along the plane of the weir as shown. Locating the lower plane, and that is, that plane below which the plane of separation should not be made, to any extent below that shown in FIG. 10 results in a too great of arcuity being present along the lower circumferencial edges of the lapping toroid opening exposing the interior channels of the segments 1 and 2, thereby generally reducing the dimensions of this opening to a degree below the fixed diameter of the interior channel, meaning that enlarged debris, such as a beer can, which may be slightly less than the interior diameter of the channel 18, could not be withdrawn from the interior channels of the segments 1 and 2, and particularly the inlet segment 1. And, in addition, the standard pipe clean out cutters cannot be conveniently inserted into such a reduced diameter for a pipe to effectively ream out the larger fixed diameter for its interior channel.

As previously mentioned, it is desirable to maintain a smooth interior surface for the interior channel of this trap. This feature is useful not only for use in sewage and fluid flow, but in addition, is very advantageous in other applications such as in the chemical industry where little or no turbulence may be desired in flow lines, or in the oil industry, or even in the flow of grains through a pipeline.

To enhance the structural reinforcement of this trap for its use in industrial applications, as previously described, both the inlet and outlet segments are joined together by means of an integral reinforcing web cast or molded together during creation of the product, thereby forming a rigid structure for the upper trap section. Each of the upper segments of the trap and the lower arcuate access portion is formed having an integral flange extending outwardly therefrom and which flanges are designed for mating in registry when the trap is assembled so that fastening means, such as bolts, can secure these two portions together into a rigid, sealed structure. Various other instrumentalities are furnished through this type of trap construction, one comprising an aperture means associated with aforesaid reinforcing web to provide for the installation of the hanger for supporting and suspending the trap during usage, while its lower arcuate portion may include a protruding boss which may be drilled, or predrilled, and perhaps tapped, with a sampling means, such as a spigot installed therein so that sewage fluids may be removed for sampling and periodic testing, where this may be desirable or required by code.

BRIEF DESCRIPTION OF THE DRAWINGS

In the drawings,

FIG. 6 shows a plan view of the arcuate access fitting portion removed from the pipe trap;

FIG. 7 provides a transverse sectional view of the access portion of the trap along the line 7—7 of FIG. 6;

FIG. 8 provides a plan view of the gasket normally arranged intermediate the arcuate access portion and the inlet and outlet segments of the trap;

FIG. 9 provides a side edge view of the gasket shown in FIG. 8;

FIG. 10 provides a sectional view of the pipe trap taken along the line 10—10 of FIG. 3; and also showing the location of the plane of separation of the trap as arranged between its weir and its downward limits;

FIG. 11 provides a bottom view of the inlet and outlet segments of the trap with the arcuate access portion being removed;

FIG. 12 provides a sectional view of the pipe trap taken along the line 12—12 of FIG. 2;

FIG. 13 discloses a side view of a modified form of an S-strap, comprising a running S-trap, incorporating the principle of this invention;

FIG. 14 discloses a modified form of this invention being incorporated within a standard S-strap.

DESCRIPTION OF THE PREFERRED EMBODIMENTS

Figure 1:
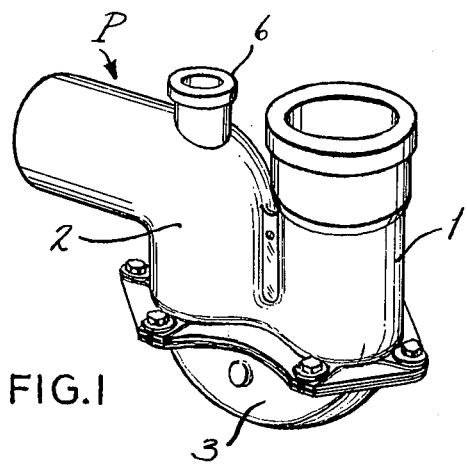
FIG. 1 discloses a perspective view of the assembled trap of this invention, in this particular instance, being a P-trap as shown.

In referring to the drawings, and in particular FIG. 1, there is disclosed a pipe trap P of this invention which includes an inlet segment 1, an outlet segment 2, and an arcuate access fitting portion 3 intervening and connecting between the aforesaid segments. As can also be seen in FIGS. 2 through 5, the inlet segment 1 incorporates the usual end bell 4 designed to provide the customary flare into which the end of the next mating pipe section may insert, usually from some form of a drain or other opening into which the sewage or other water may flow. The outlet segment of the standard P-trap generally is somewhat horizontally disposed, as at 5, for its connection to the main trunk of any sewer line customarily designed to carry away fluids from a multiple of like traps and drains. As is also shown, a vent 6 may be provided upon the outlet segment to provide a means for removal of any gases that may be generated and built up within the main trunk line.

A feature of this invention is the provision of the inlet and outlet segments of the upper section of the trap being integrally formed, and particularly reinforced by the reinforcing web 7 provided between these two segments, which may be cast into the trap where it is formed from cast iron, or molded into the same where the trap may be constructed of polymer material. In addition, one or more apertures may be provided in this web for cooperating with hangers for supporting the trap in application.

The arcuate access fitting portion of the trap, as shown, is constructed to provide uniformity of dimensions so as to complement its mounting with the upper inlet and outlet segments of the trap, and each of said segments and the arcuate portion is designed having a flaring or outwardly extending flange 8 and 9, respectively, with said flanges having a series of aligned openings or slots 10 through which the fastening means, such as the bolts 11, may be inserted and tightened for rigidly securing the trap in closure. As can be seen there are a series of such fastening means provided around the periphery of the trap flanges.

To provide for sealed closure of the access fitting portion 3 of the trap against the segments 1 and 2, there is provided a gasket 12 which has generally the same configuration as the interior channel of the trap, and capable of being tightly compressed intermediate the portion 3 and the trap upper segments to provide a fluidic seal thereat. See also FIGS. 8 and 9. The gasket further includes a series of apertures 14 which are in registry with the slots 10 formed through the trap flanges, so that the fastening means 11 may be inserted therethrough during closure of the trap. The gasket may be constructed of any form of material that enhances seal at its location of placement, but a neoprene gasket has been found useful in the preferred embodiment. That type of material should be utilized in the formation of this gasket that will withstand the corrosive effects of any of the sewage or other fluid passing through the trap.

Figure 3:
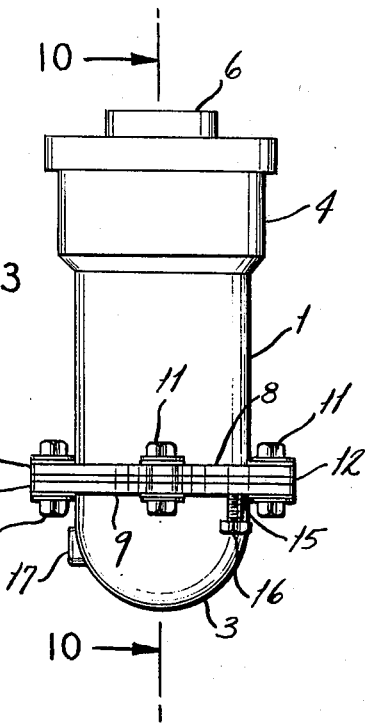
FIG. 3 provides a front view of the trap disclosed in FIG. 1.
Figure 2:
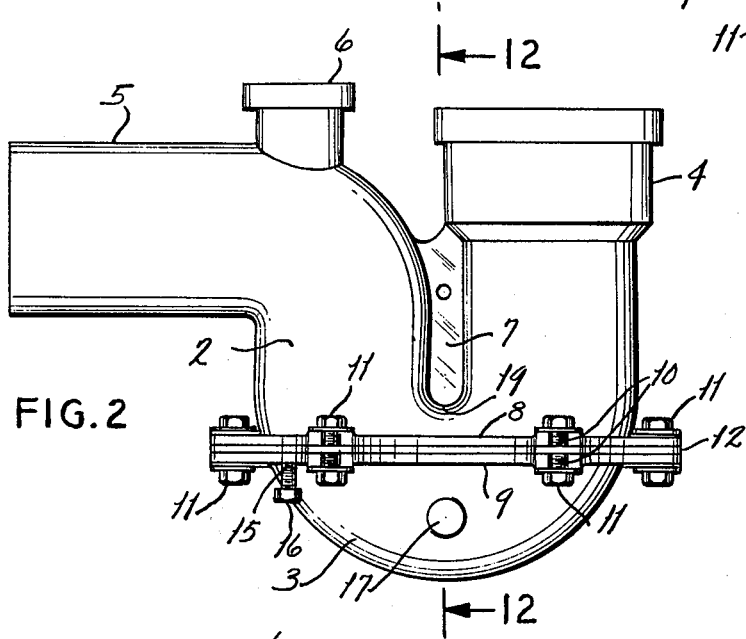
FIG. 2 provides a side view of the trap disclosed in FIG. 1.
Figure 4:
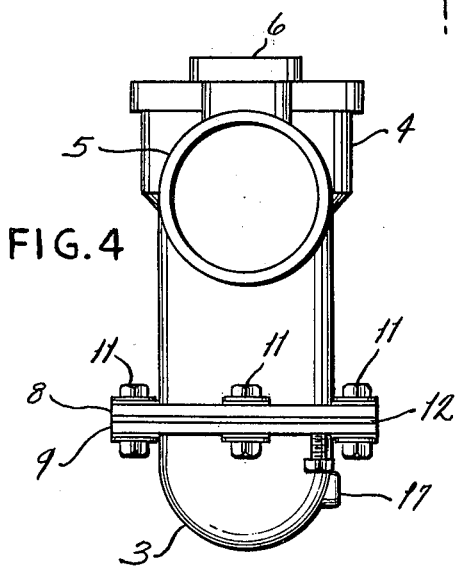
FIG. 4 discloses a back end view of the pipe trap disclosed in FIG. 1.
Figure 5:
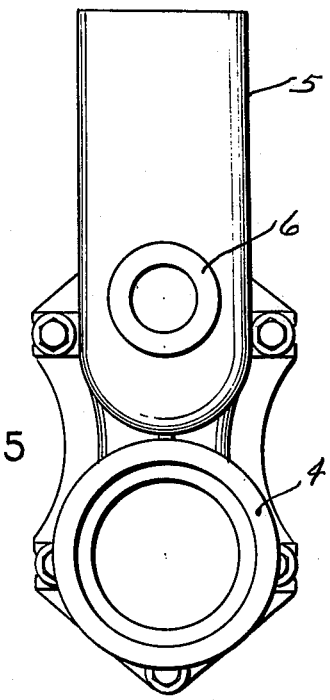
FIG. 5 provides a top view of the pipe trap shown in FIG. 1.
Figure 15:
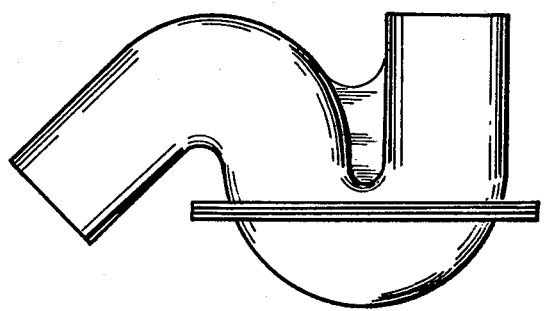
FIG. 15 discloses a side view of a modified form of an S-trap, comprising a ¾ S-trap, incorporating the principle of this invention.

Further included in one of the flanges are one or more threaded openings, as at 15, with jack screws, as at 16, fitting into and through said threaded openings, as in the lower flange 9, as shown in FIGS. 2 and 3, and capable of being turned for bearing against the solid portion of the upper flange 8 to jack or force the flanges apart for easy removal of the access fitting portion 3 from the trap.

The arcuate portion of the access fitting 3 is provided with a boss member 17 at one side as best shown in FIGS. 2 through 4 and 7. This boss may be provided with a tapped opening for receiving a removable threaded plug, and upon removal of the plug provide for the sampling or withdrawal of fluid as desired. In the alternative, the boss 17 may be provided as shown, untapped, and accordingly be drilled and tapped at a later date where desired for insertion of a plug, or other form of spigot or sampling tube that can be used for tapping off a specimen of the fluid passing through the trap for its analyzation.

As can best be seen in FIGS. 10 and 11, the trap is provided with an interior channel 18 disposed throughout the extent of its length, and this channel is formed such as to provide for a smooth surface interior wall throughout the entire trap, and furnishing a fixed diameter there along. Even where the trap is separable, as along its plane of separation as shown, the smooth wall interior of the channel 18 is continuous at its fixed diameter thereby providing no obstruction whatsoever to the continuous flow of any fluid, small debris, or sewage therethrough. The location of this plane of separation is significant to achieving the results intended from the principle of this invention, in that it is desirable that this plane be located at a point at least below the inverted weir or sluice point 19, as identified along the plane of the weir, in FIG. 10, but that said plane of separation must yet be above that mathematically determined lower plane below which the access openings into the interior channels of the inlet and outlet segments 1 and 2 are reduced below the desired fixed diameter of the channel thereby precluding full access opening lineally into the trap, to prevent the removal of any enlarged debris that may be located therein, such as the previous defined beer cans as has actually been found during usage of the prior art traps. Locating the plane of separation at any point below the lower plane level as shown encounters that region of the interior channel where it begins to curve around the arcuate portion 3 of the trap, thereby preventing this direct lineal access into the upper segments of the trap, and preventing the removal of any such identified enlarged debris that is of a diameter close to the interior fixed diameter. of the channel and has longutudinal length that prevents its withdrawal other than along the lineal axis of the inlet and outlet channels as shown. Furthermore, the plane of separation must be located below the plane of weir as shown, otherwise a locating of the said plane of separation above the weir point 19 lessens the effectiveness of the reinforcing web 7, and in addition would create a true toroid configuration that would necessitate the use of two separate gaskets for closing the pair of interior channel openings as would be exposed under that condition. Locating the plane of separation just below the plane of weir, or the weir point 19, creates a singular access opening into both the upper segments 1 and 2 of the trap, in addition to the opening provided into the arcuate portion 3 of the trap; the opening taking the form of a lapping toroid like opening necessitating only a singular gasket 12, as shown in FIG. 8, and having a corresponding single interior opening provided therethrough for immediate registry and fluidic sealing of the trap during its assembly.

As previously analyzed, the diameter of the interior channel 18 throughout the trap is of a fixed dimension, and as can also be seen in FIGS. 11 and 12, the axial opening into the inlet and outlet segments 1 and 2 are of the same interior diameter (I.D.) as is provided in the outlet segment 5. And, in addition, as is shown directly below the weir, sluice, or bight point 19, through its the complemental engagement with the arcuate portion 3, with said upper segments 1 and 2 of the trap, the same fixed diameter for the interior channel 18 is maintained. As can also be seen in FIG. 12, the fixed diameter and circumference, of the interior channel 18 at this location forms a smooth circular configuration unobstructed even by any gasket 12 disposed proximate thereat.

The principle of this invention is adaptable for use in many styles of traps presently available upon the market, and as shown in FIG. 13, inlet and outlet segments 20 and 21 are joined together for interior communication by means of an arcuate access portion 22, with the same style of complemental engagement of the segments and portion together to form a continuous smooth interior channel throughout the extent of the trap. Likewise, the positioning of the plane of separation of the trap, once again, is significant and important and would have to be determined in a manner as previously defined with respect to the P-trap shown and described in FIG. 10.

Another style of trap that can utilize the principle of this invention is shown in FIG. 14, wherein an S-trap including inlet and outlet segments 23 and 24 join with an access fitting or arcuate portion 25 through the registry of its flanges 26 and gasket 27 to provide a fluidic seal, and yet a continuous smooth interior surface for its interior channel throughout the extent of the trap. Obviously, upon consideration of the style of traps previously analyzed in this description of the preferred embodiments, the principle of this invention may be included in either a P-trap, S-trap, running S-trap, or ¾-S-trap, or any other style of trap that is adpatable to have a continuous interiorly disposed channel for a fixed diameter throughout the extent of the trap. In addition, the traps of this invention are adapted for use in industrial pipelines, or sewers, as previously described, for transmission of fluids, or even for domestic installations as needed. They can conveniently be made of cast iron, or even of other materials, such as polymer, where codes authorize the usage of the same.

Other variations in this invention may be considered by those skilled in the art upon reviewing the description of this preferred embodiment. The defined embodiment, or embodiments, are meant for illustrative purposes only, and any changes or variations within the scope of the appended claims, are intended to be secured by any claims to patent protection acquired herein.

Having thus described the invention what is claimed and desired to be secured by Letters Patent is:

1. In an industrial pipe gas trap including an inlet and an outlet segment both being of fixed diameter, and an intervening access fitting portion providing for interior communication and joining of said segments together along a plane of separation, the improvement which comprises the inlet and outlet segments and the fitting portion together having an interior channel of fixed diameter throughout its extent and forming a continuous smooth wall interior surface without obstruction along the entire length of the trap, the inlet and outlet segments being integrally connected together with their joining integral interior surface of the interior channel forming a weir thereat, web means spanning the space between the inlet and outlet segments of the trap and therein providing reinforcement and unity of structure for the integral upper segment of the trap, said plane of separation being located below the said formed weir, and said plane being located above the location where access into said segments becomes substantially constricted due to the curvature of the trap at said access fitting portion, the interior channel at the plane of separation of the trap forming lapping toroid openings in both the access fitting portion and the combined inlet and outlet segments, the diameter of each opening of the toroid provided in the combined inlet and outlet segments at the plane of separation of the trap being approximately at the fixed diameter of the interior channel thereby providing substantially full access into the interior of said trap at substantial linearity providing for the direct access into the interior channels of both the inlet and outlet segments of the trap, the lower limit to the location of the separable plane being located at a perpendicular distance from the tangent at the weir not exceeding one-fourth of the diameter of the interior channel, a first flange member integrally formed with the combined inlet and outlet segments and extending outwardly thereof, a second flange member integrally formed with the access portion and also extending outwardly thereof, each of said flange member being of corresponding dimensions and arrranged in registry when the access fitting portion is connected with the inlet and outlet segments, said flange members being arranged contigous with the said plane of separation of the trap when assembled, said flange members having openings therein to accommodate fastening bolts for securing said portions and segments securely together, whereby upon removal of the access fitting portion a substantially direct lineal access at the fixed diameter of the interior channel may be made into the inlet and outlet segments to facilitate clean out of the trap.

2. The invention of claim 1 and including a gasket having dimension generally corresponding to the dimensions of the flange members and being arranged intermediate thereof when said portion and segments of the trap are joined together, the interior of said gasket having a passageway therethrough and which conforms to the continuous smooth wall interior surface provided along the length of the trap.

3. The invention of claim 2 wherein the inlet and outlet portions of the trap are arranged upwardly in the same, while the access fitting portion is provided downwardly in the trap assembly.

4. The invention of claim 3 wherein said trap is a P-trap.

5. The invention of claim 3 wherein said trap is an S-trap.

6. The invention of claim 3 wherein said trap is a ¾-S-trap.

7. The invention of claim 3 wherein said trap is a running-S-trap.

8. The invention of claim 3 and including a boss projecting from the side of the access portion of the trap and being disposed for accommodating means for providing sampling of the contents of the trap during usage.

9. The invention of claim 1 wherein the web means has means for connection to a hanger.

* * * * *